United States Patent [19]

Millauer

[11] Patent Number: 4,732,775

[45] Date of Patent: Mar. 22, 1988

[54] PROCESSES AND APPPARATUS FOR PRODUCING EXTRUDED FOODS

[75] Inventor: Christian Millauer, Stuttgart, Fed. Rep. of Germany

[73] Assignee: Werner & Pfleiderer, Fed. Rep. of Germany

[21] Appl. No.: 878,521

[22] Filed: Jun. 23, 1986

Related U.S. Application Data

[63] Continuation of Ser. No. 664,229, Oct. 24, 1984, abandoned.

[30] Foreign Application Priority Data

Nov. 12, 1983 [DE] Fed. Rep. of Germany ....... 3341090

[51] Int. Cl.$^4$ ................................................ A23K 1/00
[52] U.S. Cl. .................................... 426/635; 426/516; 426/519; 426/520
[58] Field of Search ............... 426/635, 519, 520, 516, 426/523; 366/83–85, 88, 90, 322; 99/348

[56] References Cited

U.S. PATENT DOCUMENTS

| | | | |
|---|---|---|---|
| 3,608,868 | 9/1971 | Koch | 366/85 |
| 3,729,178 | 4/1973 | Stade | 366/84 |
| 3,813,082 | 5/1974 | Manser | 366/84 |
| 4,039,168 | 8/1977 | Caris et al. | 426/635 |
| 4,054,271 | 10/1977 | Lanzillo | 366/76 |
| 4,128,051 | 12/1978 | Hildebolt | 99/348 |
| 4,212,543 | 7/1980 | Bersano | 366/85 |
| 4,363,671 | 12/1982 | Rugg et al. | 366/88 |
| 4,368,079 | 1/1983 | Rugg et al. | 366/88 |
| 4,454,804 | 6/1984 | McCulloch | 99/353 |
| 4,474,473 | 10/1984 | Higuchi et al. | 366/85 |

FOREIGN PATENT DOCUMENTS

2461453 12/1974 Fed. Rep. of Germany.
2548285 10/1975 Fed. Rep. of Germany.

*Primary Examiner*—R. B. Penland
*Attorney, Agent, or Firm*—Laff, Whitesel, Conte & Saret

[57] ABSTRACT

In a process for producing extruded foods from a starch carrier and water as the basic mass and at least one flavor-determining component, in which the individual components are mixed and extruded by means of a screw arrangement in a casing with an extrusion nozzle, in order to ensure a complete continuity of the process and to permit the process of components with a very high water content, the starch carrier and the flavor-determining component are successively supplied to the screw arrangement in the feed direction, the components being mixed in the screw arrangement. For performing this process, an apparatus is provided, which comprises a screw arrangement in a casing with an extrusion nozzle and product feed devices which are successively arranged in the feed direction and which comprises a feed device for a starch carrier and a feed device for a flavor-determining component.

7 Claims, 2 Drawing Figures

PROCESSES AND APPPARATUS FOR PRODUCING EXTRUDED FOODS

This is a continuation of U.S. patent application Ser. No. 664,229, filed Oct. 24, 1984, now abandoned.

FIELD OF THE INVENTION

This invention relates to a process for producing extruded foods from a starch carrier and water as the basic mass and at least one flavour-determining component and to apparatus for performing the process comprising a screw arrangement in a casing having an extrusion nozzle and product feed devices.

BACKGROUND OF THE INVENTION

The production of foods by extrusion is known per se. This applies both to foods for human consumption and to animal feed and fodder.

Thus, it is, for example, known for German Offenlegungsschrift No. 2548285 in connection with the production of starch-containing products to be used as snacks, to feed starch-containing starch products with a residual moisture content of about 10% into a twin-screw extruder, in which there is a gelling process, followed by texturing. There is, however, no addition of flavour-determining ingredients with a high water content, or of water as such.

German Offenlegungsschrift No. 2461453 describes a process for producing dry food from protein-containing and optionally starch-containing raw materials, in which the latter are mixed with water and are extruded forming a product strand or ribbon under elevated temperature and pressure and which, on leaving the screw extruder, spontaneously expands accompanied by the elimination of moisture. As a result, the end product has a porous structure. According to this process, the raw materials are discontinuously premixed, so that the starting product is a raw material mixture having a moisture content of approximately 15% and is fed to the screw arrangement by means of a single supply device. The object is to ensure that the extruded end product does not have to be subsequently dried.

SUMMARY OF THE INVENTION

The object of the invention is to provide a process and an apparatus making it possible to produce an extruded end product without premixing of starch-containing and flavour-determining, e.g. protein-containing starting product. A satisfactory consistency of this end product, i.e. particularly an adequate strength must still be achievable if at least one of the added components has a relatively high proportion of water.

Accordingly, the present invention provides a process for producing extruded foods from a starch carrier and water as the basic mass and at least one flavour-determining component, said process comprising mixing together the individual components and extruding the mixed components through an extrusion nozzle by means of a screw arrangement in a casing, in which the starch carrier and the flavour-determining component are successively supplied to the screw arrangement in the feed direction, the components being mixed in the screw arrangement. This makes it possible to supply the starch-containing components e.g. flour to the screw arrangement with a minimum water content. This leads to a very high viscosity so that high shear forces can be introduced and a good gelling of the starch-like component can be obtained. Compared with a partially gelled product, the thus gelled starch has a higher binding power, so that the proportion of added starch-containing components can be relatively small. The gelled product is heated to approximately 120° to 180° C. and only then is the flavour-determining component with a high water content, e.g. a water-containing meat-paste supplied. There can then be a good thorough mixing with the gelled, starch-containing product and as a result of this good binding-in action, a high viscosity mixed product is obtained, into which a high energy level can be introduced via the screw arrangement. This can bring about a further heating for destroying e.g. spores which are present in the meat. Simultaneously, the consistency reached ensures a problem-fee extrusion and shaped parts are obtained immediately on extrusion.

Preferably, following the addition of the starch carrier, water is added in the feed direction. The addition of water after adding the starch carrier permits a finely dosable moisture addition which is independent of the other components added or which compensates their water content.

The starch carrier is desirably added with only a very limited water content. The very low water content of the starch carrier can be achieved according to the present invention because there is no need to simultaneously add other components which naturally have a high water content. This low water content of the starch carrier aids gelling and the introduction of energy in the screw arrangement.

The extrusion nozzle is desirably provided with a strainer plate through which extrusion of the mixed components takes place. This makes it possible to use the end product as an immediately marketable product.

For producing animal feed, flour is preferably used as the starch carrier and meat waste is preferably used as the flavour-determiming component. This development of the process according to the invention is particularly advantageous.

Alternatively, flour may be used as the starch carrier and hydrolyzed together with a little sugar and glucose and molasses may be used as flavour-determining components in order to produce licorice for human consumption.

The flavour-determining components may be added via a dosing pump. This not only permits a clearly defined, uniform addition, but also makes it possible to maintain the pressure prevailing in the additional region of the screw arrangement.

The process according to the invention is preferably performed by means of an apparatus comprising a screw arrangement in a casing having an extrusion nozzle and product feed devices successively arranged in the feed direction and comprising at least a feed device for a starch carrier and a feed device for a flavour-determining component. The separate addition devices along the screw arrangement permit continuous working without premixing of the starting products, because the starch carrier has gelled prior to the addition of the components with the higher water content.

It is particularly advantageous if a positive displacement pump is provided for adding the flavour-determining component.

Preferably, the screw arrangement has a screw configuration which is constructed in such a way that in the vicinity of the feed devices there is a feed zone which is in each case followed by a kneading and mixing zone. This construction ensures that problem-free introduction always takes place in the feed area and that following onto this adequate thorough mixing and energy introduction can be ensured.

BRIEF DESCRIPTION OF THE DRAWINGS

The invention will now be further described, by way of example, with reference to the drawings, in which.

DESCRIPTION OF PREFERRED EMBODIMENT

Figure 1:
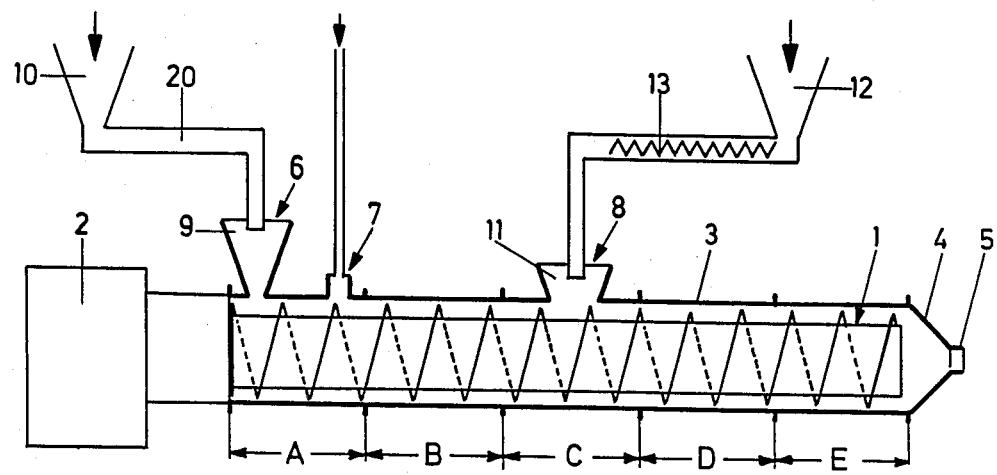
FIG. 1 is a diagrammatic section through a preferred embodiment of an apparatus according to the invention.

A screw arrangement 1 shown in FIG. 1 comprises a twin-screw arrangement, but in principle it is also possible to use a single screw. The screw arrangement 1 is driven by a diagrammatically represented motor 2, which can e.g. have a power of 30 to 80 kW. The screw arrangement is housed in a casing 3, which has a tapered portion 4 at one end at which an extrusion nozzle 5 is provided. In the vicinity of the latter, a strainer plate (not shown) can be provided. Feed devices 6, 7 and 8 are arranged in spaced manner along the casing 3.

The feed device 6 for a starch carrier comprises hopper arrangements 9, 10, which are connected by a diagrammatically represented connecting line 20. The feed device 7 is used for introducing water and for this purpose conventional, not shown, flow regulators are provided. The feed device 8 is used for the supply of flavour-determining components, optionally with a high water content. It comprises diagrammatically shown hopper arrangements 11, 12 and a positive displacement pump as a dosing pump 13.

Figure 2:
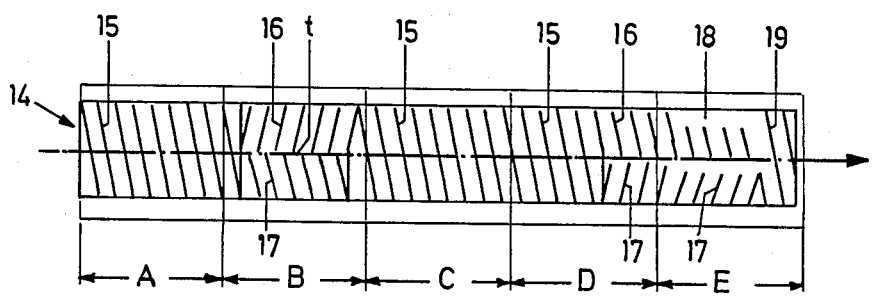
FIG. 2 shows a diagrammatic development of the screw configuration.

FIG. 2 diagrammatically shows the screw configuration of the screws 14 used in the form of a developed projection. In a first zone A, the screw land 15 is constructed as a feed thread. In a mixing and kneading zone B following on thereto are provided two screw lands 16, 17, which are displaced from one another by a pitch t. Thus, a return movement is superimposed on the forward feed movement, which makes it possible to increase the degree of filling and consequently the level of shear forces introduced. The following zone C is once again constructed the same as zone A. The construction of the following zone D in its front part in the feed direction corresponds to the configuration in zone C. The rear part in the feed direction has divided screw lands 16, 17 corresponding to zone B. Zone E is constructed in the same way, flow channels 18 for finished products being provided, which are discharged via screw lands 19. Thus, in the vicinity of the feed devices 6 or 7 and 8, in each case feed zones A, C are formed which ensure a good product introduction, whilst this is followed by a mixing and kneading zone B or D, which ensures a good thorough mixing and energy introduction into the product.

The process according to the invention is further illustrated hereinafter by two examples.

EXAMPLE 1

For producing an animal feed, use is made as starting products of flour as the starch carrier, water and meat-paste with a water content of 60 to 90%. The flour is added in a proportion of 20 to 50% and the meat-paste in a proportion of 80 to 50%. The starting temperatures of the flour and water are in each case 20° C., whilst that of the meat-paste can be between 20° and 50° C.

In the case of a screw speed of 300 revolutions per minute (with an output of approximately 160 kW), a temperature of approximately 140 to 180° C. is reached in zone B. The pressure built up in front of the extrusion nozzle 5 is 4 to 100 bar.

The product obtained is compact, dry and can be used in this state.

EXAMPLE 2

For producing licorice, flour as the starch carrier can be hydrolyzed with sugar and a little water.

Glucose, molasses and flavours are added in place of the meat-paste of Example 1.

The invention is not restricted to the above-described embodiment and examples but modifications and variations may be made without departing from the spirit and scope of the invention as defined by the appended claims.

I claim:

1. A process for producing starch based extruded foods containing starch, water and at least one flavorant, said process consisting essentially of the following steps feeding 20 to 50% of dry starch based on the combined amount of starch and flavorant to a screw extruder in a feed zone, downstream of the addition of said dry starch adding only sufficient water to said screw extruder to provide a gelled product, mixing and kneading said starch and water in a first mixing zone of said screw extruder to provide a starch water mixture, gelling and heating said starch-water mixture to a temperature in the range of about 120 to 180° C. using substantially only shear forces of said screw extruder, adding said flavorant having a water content of more than 50% to said gelled heated starch-water mixture in a flavorant feeding zone of said screw extruder downstream of said first mixing zone, mixing and kneading said flavorant and said heated gelled starch-water mixture to form a flavored-starch mixture in a second mixing zone of said screw extruder and extruding said flavored starch mixture from said screw extruder.

2. A process as claimed in claim 1, wherein an extrusion nozzle is provided with a strainer plate through which extrusion of said flavored starch mixture takes place.

3. A process as claimed in claim 1, wherein said extruded food is an animal feed, said starch is flour, and said flavorant is meat waste.

4. A process as claimed in claim 3 wherein said meat waste contains between 60 to 90% of water and is present in an amount of 50 to 80% of meat waste based on the combined amount of meat waste and flour.

5. A process as claimed in claim 1, wherein said extruded food is licorice, said starch is flour, and said flavorant is a mixture of glucose and molasses.

6. A process as claimed in claim 1, wherein the flavorant is added by a dosing pump.

7. A process for producing starch based extruded foods containing starch, water and at least one flavorant, said process consisting essentially of the following steps feeding 20 to 50% of dry starch based on the combined amount of starch and flavorant to a screw extruder, downstream of the addition of said dry starch adding only sufficient water to said screw extruder to provide a gelled product, mixing said starch and water in a first mixing zone of said screw extruder to a temperature in the range of about 120° to 180° C. using substantially only shear forces of said screw extruder to provide a gelled starch water mixture, adding said flavorant having a water content of 60 to 90% into a flavorant feeding zone of said screw extruder located downstream of said first mixing zone, heating and mixing said flavorant and said heated gelled starch-water mixture to form a flavored-starch mixture in a second mixing zone of said screw extruder and extruding said flavored starch mixture from said screw extruder.

* * * * *